United States Patent [19]

Stewart

[11] Patent Number: 4,709,939

[45] Date of Patent: Dec. 1, 1987

[54] FRONT WHEEL CENTERING MECHANISM FOR WHEELCHAIRS

[76] Inventor: Raymond Stewart, 9026 Horley Ave., Downey, Calif. 90240

[21] Appl. No.: 925,967

[22] Filed: Nov. 3, 1986

[51] Int. Cl.⁴ .................................... B62M 1/14

[52] U.S. Cl. .............................. 280/242 WC; 280/94; 297/DIG. 4

[58] Field of Search ............... 280/242 WC, 225, 240, 280/263, 265, 289 WC, 94, 267, 268; 297/DIG. 4

[56] References Cited

U.S. PATENT DOCUMENTS

| | | | |
|---|---|---|---|
| 1,025,432 | 5/1912 | Theermn | 280/94 |
| 1,100,713 | 6/1914 | Colson | 280/94 X |
| 1,157,628 | 10/1915 | Law | 280/94 |
| 1,346,211 | 7/1920 | Johnson | 280/94 |
| 1,457,975 | 6/1923 | Hoffman | 280/94 |
| 2,096,650 | 10/1937 | Del Rio | 280/94 |
| 4,360,213 | 11/1982 | Rudwick et al. | 280/242 WC |

FOREIGN PATENT DOCUMENTS

| | | | |
|---|---|---|---|
| 945 | 2/1897 | Denmark | 280/268 |

*Primary Examiner*—James T. McCall

*Attorney, Agent, or Firm*—Charles H. Thomas

[57] ABSTRACT

A centering mechanism is provided for the front wheels of a wheelchair having pairs of front and rear wheels. The centering mechanism has particular applicability for racing wheelchairs, such as those used in marathon racing. Linkage is employed to form a parallelogram structure with hinged corners, upon which the front wheels of the wheelchair are mounted by means of stub axles. The linkage holds the front wheels mutually parallel to each other while the centering mechanism returns the front wheels to parallel alignment with the rear wheels upon release of a steering device.

12 Claims, 8 Drawing Figures

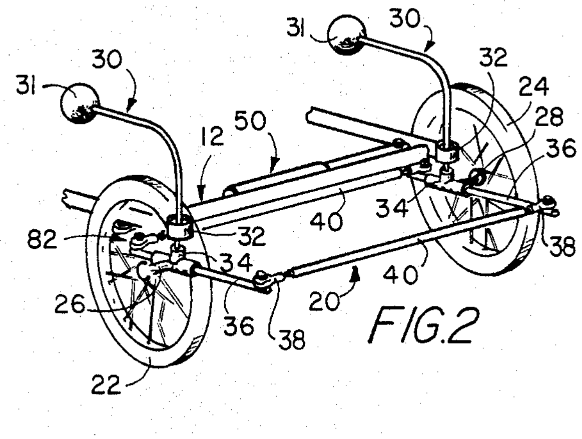
FIG.2
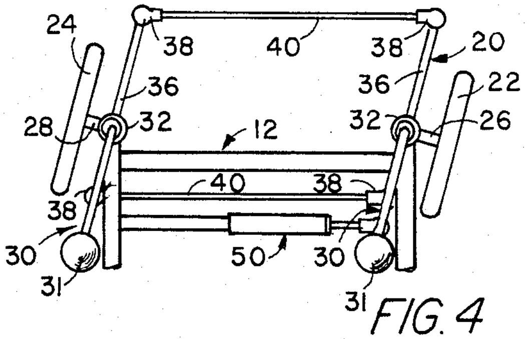
FIG.4
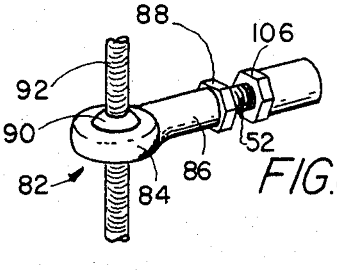
FIG.8
FIG.1
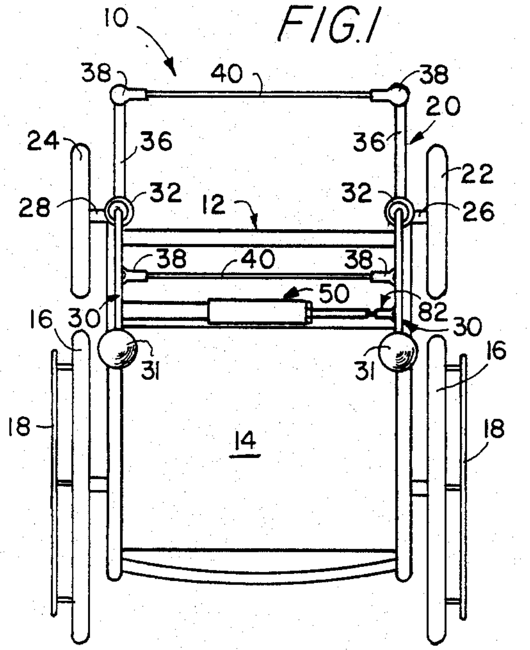
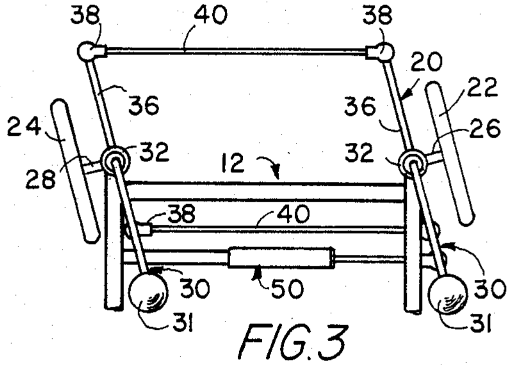
FIG.3
FIG.5
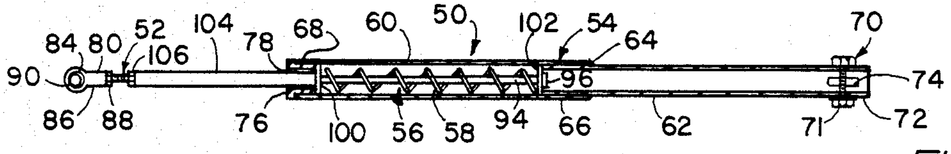
FIG.6
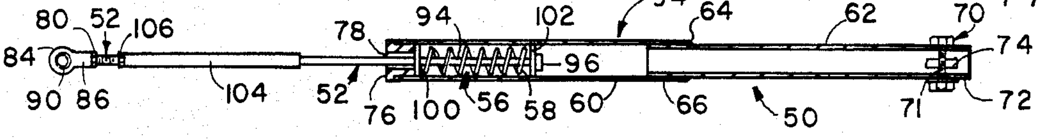
FIG.7
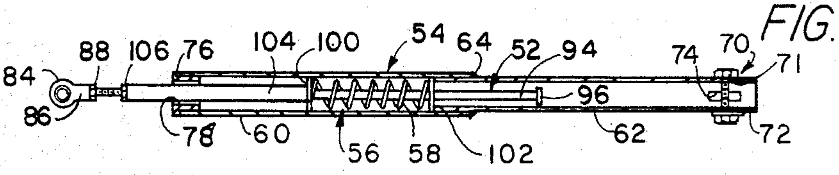

FRONT WHEEL CENTERING MECHANISM FOR WHEELCHAIRS

BACKGROUND OF THE INVENTION

1. Field of the Invention

The present invention relates to an improvement to a wheelchair, particularly a wheelchair utilized for racing purposes, and to a wheel centering mechanism for the front wheels of a wheelchair.

2. Description of the Prior Art

At present, most conventional wheelchairs are constructed with large rear wheels mounted in parallel, spaced fashion to support a frame and a seat thereon, and a pair of smaller, front wheels which also support the frame from beneath. The rear wheels of conventional wheelchairs are equipped with large, circular driving handwheels thereon, by means of which the wheelchair occupant manually propels the wheelchair. The front wheels of a conventional wheelchair are typically mounted independently of each other upon free-wheeling casters.

Conventional wheelchairs are typically steered by the occupant by means of the handwheels on the rear wheels. That is, when the wheelchair occupant wishes to turn to the right, a greater forward driving force is exerted on the driving handwheel of the left rear wheel than on the right rear wheel. Indeed, for a sharp right turn approaching a pivoting action a rearward driving force may be exerted on the handwheel of the right rear wheel while a forward driving force is exerted on the handwheel of the left rear wheel. To execute a left turn, the foregoing forces are reversed.

With front wheels independently attached to the frame by means of casters the wheelchair occupant has enhanced maneuverability and can execute extremely sharp turns. The front wheels, and the casters upon which they are mounted can be turned and twisted independently of each other, and the front wheels are not always disposed in mutually parallel relationship.

While conventional wheelchairs constructed as heretofore described are designed to maximize maneuverability and mobility for disabled persons, the very features which provide a high degree of maneuverability create considerable problems when wheelchairs are used for special purposes. Specifically, in recent years disabled persons have gained increasing interest in physical activities in which wheelchairs are propelled at high speeds. For example, although most major marathon races, were initially open only to persons running on foot, they now include a wheelchair division in which disabled persons may race in wheelchairs. Also, the sport of basketball has gained increased popularity to teams whose members must use wheelchairs.

When conventional wheelchairs are operated at high speeds, they tend to become unstable, particularly when they are turned. In marathon or other long distance wheelchair racing the front wheels of a wheelchair, in particular, experience a lack of stability. Conventional, caster mounted front wheels tend to vibrate and shimmy when a wheelchair is operated at a substantial speed, such as in competitive wheelchair racing. This condition becomes particularly dangerous during turning maneuvers executed at high speed, even if the turning radius is quite large. In conventional wheelchairs which employ front wheel casters, it is possible for one of the casters to twist sharply relative to the other, since the front wheels are mounted for orientation independently of each other. When this occurs, the wheelchair can turn over, and the occupant can be thrown to the ground. Even in the absence of such a disasterous twisting of a front wheel, the design of conventional wheelchairs creates problems when those chairs are operated at high speeds. The wheelchair occupant must combat the vibration and shimmying of the front wheels with intense concentration to ensure that driving power is appled equally to the driving handwheels of the wheelchair. Also, the vibration and shimmying of the front wheels creates a finite drag on the forward progress of the wheelchair, which must be overcome with additional driving force. As a result, the wheelchair occupant is thereby unnecessarily slowed and fatigued with operating a conventional wheelchair in racing or in some other athletic or high speed activity.

SUMMARY OF THE INVENTION

It is an object of the present invention to provide a wheelchair of improved design which alleviates the problem of front wheel instability when the wheelchair is operated at high speeds. To this end, a wheelchair according to the invention is provided with a linkage mechanism which holds the front wheels of the wheelchair in mutually parallel alignment, a steering device connected to the linkage mechanism to control the orientation of the front wheels of the wheelchair, and a centering mechanism coupled between he wheelchair frame and the linkage so as to return the front wheels of the wheelchair to mutually parallel alignment and alignment parallel with the rear wheels upon release of the steering device.

Another object of the invention is to provide a highly effective centering mechanism for the front wheels of a wheelchair. The centering mechanism employs a pair of telescoping members which are spring biased toward a selected degree of overlap so as to produce a centering structure which may selectively be adjusted in length, but which will return to a predetermined overall effective length when released. One end of the centering mechanism is connected to the wheelchair frame, and the other end is connected to either the front wheel carriage linkage or to the steering mechanism directly. The overall effective length of the centering mechanism, and the extent of overlap of the telescoping members, is lengthened when the wheelchair is turned in one direction and shortened when the wheelchair is turned in the opposite direction. A spring biasing mechanism is employed to return the telescoping members to predetermined positions which define a perdetermined degree of overlap and a predetermined overall length, once force on the steering mechanism is released.

By employing the improved wheelchair construction of the invention, a wheelchair occupant is relieved of the intense concentration which is otherwise required to combat instability of the front wheels of a wheelchair operated at high speeds. This increases the speed at which the wheelchair can be operated, improves the safety of operation, and reduces fatigue to the wheelchair occupant.

In one broad aspect the invention may be considered to be a wheelchair comprised of a frame supporting a seat, a pair of rear wheels mounted in fixed orientation relative to the frame and having driving handwheels thereon, linkage forming a parallelogram structure with hinged corners, a pair of front wheels, steering means, and a centering means. The front wheels are mounted on the parallelogram structure in mutually parallel alignment and are movable by the parallelogram structure in adjustable alignment relative to the rear wheels. The steering means is coupled to the parallelogram structure to selectively adjust the alignment of the front wheels. The centering means returns the front wheels to parallel alignment wih the rear wheels upon release of the steering means. The centering means includes a first member coupled to the parallelogram structure, a second member coupled to the frame in longitudinally offset, overlapping, telescopic reciprocal fashion relative to the first member, and spring biasing means. The spring biasing means acts to urge the first and second members toward relative longitudinal positions defining a predetermined distance of overlap.

In another broad aspect the invention may be considered to be an improvement to a wheelchair having front and rear wheels mounted to support a frame. The improvement of the invention is comprised of parallelogram front wheel connecting linkage means, steering means and a centering means. The parallelogram linkage means is secured to the frame to allow the front wheels to be adjusted in orientation relative to the frame and to hold the front wheels parallel to each other. The steering means is coupled to the front wheel connecting linkage to control the orientation of the front wheels relative to the frame. The centering means has one telescopic element coupled to the frame and another telescoping element connected to the linkage means. The telescoping elements are longitudinally offset from each other in mutually overlapping fashion. The biasing means biases the telescoping elements toward a selected overall length. With such a construction, manipulation of the steering means overcomes the biasing means to move the telescoping elements in longitudinally reciprocal fashion.

In yet another broad aspect the invention may be considered to be a wheel centering mechanism for the front wheels of a wheelchair that has pairs of front and rear wheels mounted on a frame. According to this aspect of the invention, the wheel connecting linkage forms a parallelogram structure having hinged corners and including stub axles extending laterally from opposite fore and aft sides of the parallelogram structure. The parallelogram structure carries the front wheels in mutually parallel disposition relative to each other. The parallelogram structure is hingedly secured to the frame. A steering mechanism is coupled to vary the distance between opposite sides of the parallelogram structure. That is, considered in a mathematical geometric fashion, the steering mechanism varies the height of the parallelogram structure between two opposite sides which form the parallelogram bases.

The wheel centering mechanism of the invention also includes first and second annular tubes in which the second tube is of smaller diameter than the first tube and is secured coaxially within one end of the first tube. The second tube extends longitudinally from the first tube to a first coupling remote from the first tube. The first tube has a bushing which defines an annular end orifice at the end of the first tube opposite the second tube. The end orifice is of a diameter reduced from the internal diameter of the first tube. A linear rod is mounted within the first tube with a protruding end extending out of the first tube through the end orifice. The protruding end of the rod has a second coupling thereon. The rod also has a captured end having a retaining element secured theron. Abutment means are located on the rod in spaced separation from the retaining element. A first annular washer is slideably disposed about the captured end of the rod and is limited in longitudinal movement by the abutment means and by the bushing. A second annular washer is slideably disposed about the captured end of the rod and is limited in longitudinal movement by the retaining element and by the second tube. A coil spring is disposed coaxially about the captured end of the rod to bias the first and second annular washers apart. One of the first and second couplings is connected to the wheelchair frame, while the other coupling is connected to the parallelogram structure.

In all of the embodiments of the invention, the telescoping members are biased toward a particular extent, distance or degree of overlap, so that the overall effective length of the telescoping members is a known, predetermined length, when the telescoping members are released to their unbiased, neutral condition. Preferably, this length is adjustable so that the centering mechanism can be adapted for use on different wheelchairs having differing dimensions.

The invention may be described with greater clarity and particularity by reference to the accompanying drawings.

DESCRIPTION OF THE DRAWINGS

FIG. 1 is a top plan view of a wheelchair constructed according to the invention.

FIG. 2 is a perspective elevational view of a portion of the wheelchair of FIG. 1.

FIG. 3 is a top plan view of FIG. 2 showing the front wheels turned to the left.

FIG. 4 is a top plan view of FIG. 2 showing the front wheels turned to the right.

FIG. 5 is a sectional elevational view of the centering means employed in the wheelchair of FIG. 1 when the steering mechanism thereof is released.

FIG. 6 is a sectional elevational view of the centering means of FIG. 5 with telescoping members in an extended condition.

FIG. 7 is a sectional elevational view of the centering means of FIG. 5 with the telescoping members thereof retracted.

FIG. 8 is a perspective detail showing one of the couplings employed in the wheelchair of FIG. 1.

DESCRIPTION OF THE EMBODIMENT

FIG. 1 illustrates a wheelchair 10 which is comprised of a frame 12 supporting a seat 14 and which has a pair of rear wheels 16 mounted in fixed orientation relative to the frame 12. Their rear wheels 16 have driving handwheels 18 thereon. The wheelchair 10 has linkage which forms a parallelogram structure indicated generally at 20, and which is best depicted in FIGS. 2, 3 and 4.

A pair of front wheels 22 and 24 are mounted on the parallelogram structure 20 by means of stub axles 26 and 28, respectively. The front wheels 22 and 24 are oriented by the parallelogram structure 20 in mutually parallel alignment and are movable by the parallelogram structure 20 in adjustable alignment relative to the rear wheels 16 as best depicted in FIGS. 1, 3 and 4.

The wheelchair 10 also includes steering means 30 in the form of a pair of generally angled shaped steering levers having spherical gripping knobs 31 at their upper and rearward extermities. The lower ends of the steering levers 30 pass vertically through bearings in upright sleeves 32 which are welded to the frame 12. The lower extremities of the steering levers 30 terminate in T-shaped connectors 34 which are rigidly secured to the parallelogram structure 20. The stub axles 26 and 28 extend laterally outwardly from the T-shaped connectors 34 on opposite sides of the wheelchair 10 as best depicted in FIG. 2. The lower extremities of the steering levers 30 are rigidly secured to the upright legs of the T-shaped connectors 34, and the fore and aft links 36 of the parallelogram structure 20 are secured within the longitudinal arms of the T-shaped connectors 34.

When either steering lever 30 is pushed to either the right, or the left, as depicted in FIGS. 3 and 4, respectively, both steering levers 30 are turned in rotation within their respective sleeves 32. The lower extremities of the steering levers 30 thereby act through the rigid joints at the connectors 34 to force the fore and aft sides or links 36 of the parallelogram structure 20 to move in corresponding fashion as depicted in FIGS. 3 and 4. The corners of the parallelogram structure 20 are hinged by means of pivot connectors 38, so that the fore and aft sides 36 of the parallelogram structure 20 always remain mutually parallel to each other. Likewise, the transverse sides 40 of the parallelogram structure 20 are also maintained parallel to each other.

Either steering lever 30 may be utilized to turn the front wheels 22 and 24 to either the left, or to the right, as depicted respectively in FIGS. 3 and 4. Whatever the position of the steering levers 30, the front wheels 22 and 24 will always remain in mutually parallel alignment with each other, but are movable by means of the parallelogram structure 20 in adjustable alignment relative to the rear wheels 16. The steering levers 30 may thereby be utilized to selectively adjust the alignment and orientation of the front wheels 22 and 24 relative to the rear wheels 16 and to the frame 12. The parallelogram structure 20 is hingedly or rotatably secured to the frame 12 by means of the sleeves 32.

An extremely important feature of the wheelchair 10 is the provision of a centering means or mechanism 50. The centering means 50 serves to return the front wheels 22 and 24 to the positions depicted in FIG. 1, where they are in parallel alignment with respect to the rear wheels 16, upon release of the steering levers 30. The structure of the centering means 50 is best depicted in FIGS. 5–7.

The centering means 50 includes a first member in the form of a solid, cylindrical rod 52, which is coupled to the parallelogram structure 20, and a second member in the form of a tubular structure indicated at 54. The tubular structure 54 is coupled to the frame 12 in longitudinally offset, overlapping, telescopic reciprocal fashion relative to the rod member 52. The centering means 50 also includes a spring biasing means 56, which includes a helical, compressible spring 58. The spring biasing means 56 acts to urge the rod member 52 and the tubular member 54 toward relative longitudinal positions defining a predetermined distance of overlap. FIG. 5 depicts the rod member 52 and the tubular structure 54 at the predetermined distance of overlap when the steering handles 30 are released and the front wheels 22 and 24 are aligned parallel with the rear wheels 16, as depicted in FIG. 1.

The biasing means 56 also biases the telescoping elements or members 52 and 54 toward a selected overall length, as depicted in FIG. 1. Manipulation of either of the steering levers 30 overcomes the biasing means 56 to move the telescoping elements 52 and 54 in longitudinally reciprocal fashion, as illustrated in FIGS. 3, 4, 6 and 7.

The second or tubular member 54 of the centering means 50 is comprised of a pair of first and second tubes 60 and 62, respectively. The tubes 60 and 62 longitudinally overlap, preferably by a distance of about one inch. The tube 62 is secured by a weld 64 coaxially within the end 66 of the tube 60. The first tube 60 is preferably seven-eighths of an inch in diameter and 0.058 inches in wall thickness. The tube 60 is preferably constructed with an overall length of about four and one half inches from number 6061 T6 aluminum tubing. The tube 60 has an interior diameter of three-quarters of an inch and is internally threaded at the end 68.

The second tube 62 is three-quarters of an inch in outer diameter and about six inches in length. The second tube 62 also has a wall thickness of 0.058 inches and is formed of 6061 T6 aluminum tubing. As is evident from FIGS. 5, 6 and 7, the second section of the tubular structure 54 formed by the second tube 62 is of a smaller internal diameter than the first section or tube 60. The internal diameter of the tube 62 is nominally three-eighths of an inch. The tube 62 includes a coupling 70, which is connected to the frame 12. The coupling 70 includes a 10–32 bolt 71 which passes entirely through the structure of the tube 62 at the end 72 thereof. There are a pair of slots 74, both one an one-quarter inches long by three-eighths of an inch in width, machine milled through both sides of the tube 62 in a ninety degree offset from the center line of the holes which receive the shank of the bolt 71. The slots 74 accommodate a longitudinal member of the frame 12, and the end 72 of the tube 62 is secured to the frame 12 by means of the bolt 71. The coupling 70 thereby forms a hinge connection which allows the centering means 50 to rotate in a horizontal plane relative to the frame 12 about the shank of the bolt 71 of the coupling 70.

The tube 62 extends longitudinally from the end 66 of the first tube 60 to the first coupling 70 which is remote from the first tube 60. The overall length of the telescoping tubular structure 54 is about nine and a half inches.

The first tube 60 has a bushing 76 which defines an annular orifice 78 at the end 68 of the tube 60 opposite the second tube 66. The end orifice 78 is of a diameter reduced from the internal diameter of the tube 60. The bushing 76 is an externally threaded one-half inch diameter chase nipple, having a lip which extends radially outwardly and which abuts against the end 68 of the tube 60. The bushing 76 is threadably engaged in the end 68 of the tube 60.

The rod 52 is a linear, cylindrical structure which is mounted for reciprocal movement within the end orifice or annulus 78. The rod 72 is an externally threaded bolt which has a free end protruding from the tube 60. At the free end of the rod 52 there is an internally threaded socket portion 80 of a coupling 82 which is joined to the parallelogram structure 20. The socket portion 80 includes a collar 84 having a vertically oriented axial cavity therein. The collar 84 is secured to the free end of the rod 52 by means of an internally threaded socket sleeve 86. The socket sleeve 86 has an internal diameter of five-sixteenths of an inch and is internally threaded with twenty threads per inch. The socket sleeve 86 screws onto the externally threaded free end of the rod 52 and is secured in position by a jam nut 88.

The collar 84 is adapted to receive and capture a spherical bearing 90, depicted in FIG. 8, which has an axial aperture therethrough. The aperture in the spherical bearing 90 is one-quarter of an inch in diameter and is internally threaded with twenty threads per inch. The spherical connector 90 is adapted for threaded engagement with an externally threaded control bolt or stud 92, depicted in FIG. 8, which extends upwardly from an extension of one of the fore and aft sides 36 of the parallelogram structure 20.

The coupling 82, depicted in detail in FIG. 8, allows limited, omnidirectional rotation of the spherical bearing 90 relative to the collar 84 in which the connector 90 is captured. The coupling 82 may be descriptively termed a uniball self contained spherical self-aligning bearing, and is manufactured by the Heim Company, which is a subsidiary of North American Rockwell. The use of the coupling 82 is particularly advantageous, since the omnidirectional nature of the connection prevents binding when the coupling 82 is moved laterally, as depicted in FIGS. 4 and 5.

Remote from the coupling 82, the rod member 52 has a captured end 94 which is located within the second tubular member 54. The captured end 94 has a retaining element 96 in the form of an enlarged head, which has a diameter larger than the outer diameter of the rod 94 but smaller than the internal diameter of the tube 62. As illustrated in FIGS. 5, 6 and 7, the spring biasing means 56 is disposed coaxially about the linear rod 52. The spring biasing means 56 is comprised of the coil spring 58, disposed about the captured end 94 of the rod 52, and first and second washers indicated at 100 and 102, respectively. Both of the washers 100 and 102 are of annular configuration, three-quarters of an inch in outer diameter and with an axial aperture five-sixteenths of an inch in diameter. The washers 100 and 102 are three-eighths of an inch in thickness.

The coil spring 58 is a 23/32 inch spring requiring a deflection force of twelve pounds per inch. As illustrated in FIGS. 5, 6 and 7, the first and second washers 100 and 102 are disposed about the captured end 94 of the rod 52 at opposite ends of the coil spring 58. The coil spring 58 thereby biases the washers 100 and 102 apart. The bushing 76 and the second, tubular member 54 confines the washers 100 and 102 and the coil spring 58 located therebetween within the first tube 60.

The spring biasing means 56 also includes an abutment means in the form of a tubular spacing sleeve 104 which is located coaxially about the rod 52 between the collar 84 of the coupling 82 and the first washer 100. The abutment sleeve 104 is three-eighths of an inch in internal diameter and has a wall thickness of 0.028 inches. The abutment spacing sleeve 104 is formed of 4130 steel tubing and slides over the five-sixteenths inch diameter shank of the rod 52, to but up against the washer 100 on the side thereof opposite the spring 58. The abutment sleeve 104 is preferably about three and one-quarter inches in length.

The centering means 50 also includes a means for adjusting the predetermined distance of overlap between the rod 52 and the tubular structure 54. This adjusting means is in the form of a five-sixteenths inch diameter self-locking nut 106, having twenty threads per inch. The adjusting nut 106 is used to longitudinally adjust the position of the abutment sleeve 104 along the rod 52, to thereby adjust the extent of the overlap between the rod 52 and the first and second tubes 60 and 62 when the steering levers 30 are released. The adjusting nut 106 also is used to establish the predetermined, overall length of the centering means 50 when the steering levers 30 are released.

When the wheelchair 10 is operated, the occupant propels the chair 10 by rotating the handwheels 18. No manipulation of the steering levers 30 is necessary to propel the wheelchair 10 along a straight course, as the centering means 50 will hold the front wheels 22 and 24 in parallel alignment with the rear wheels 16 unless one of the steering levers 30 is turned to the right or to the left. FIG. 1 illustrates the positions in which the front wheels 22 and 24 are maintained by the centering means 50 when the steering levers 30 are released, and FIG. 5 illustrates the positions of the operating elements of the centering means 50 when the front wheels 22 and 24 are in the positions depicted in FIG. 1. When the centering means 50 is in this condition the retaining head 96 of the rod 52 resides in contact with the washer 102, but the coil spring 58 presses outwardly against the washers 100 and 102, thereby forcing the washer 102 into abutment against the transverse annular edge of the end of the tube 62 which is welded to the tube 60. The coil spring 58 also compresses the washer 100 against the transverse annular face of the bushing 76.

When one of the steering levers 30 is pushed to the right in order to turn the front wheels 22 and 24 to the left, as depicted in FIG. 3, the shank of the pin 92 will pull upon the collar 84 at the coupling 82, thereby pulling the rod member 52 further out of the tubular structure 54, in the manner depicted in FIG. 6. This action causes further compression of the spring 58, since extension of the rod 52 further from the tube 60 causes the spring 58, the washers 100 and 102, and the retaining head 96 to act as a first means for compressing the coil spring 58 when the telescoping members 52 and 54 are drawn apart.

Once the rod member 52 has been extended from the tubular structure 54, the action of the coil spring 58 will cause the wheels 22 and 24 to return from the positions of FIG. 3 to the positions of FIG. 1 once force is released from the steering levers 30. Specifically, as soon as that force is released, the compressed coil spring 58 will expand, thus carrying the rod member 52 from the position of FIG. 6 back to the neutral equilibrium position of FIG. 5. It should be noted that there is a slight rotational movement of the centering means 50 in moving between the positions of FIG. 1 and FIG. 3. Rotation of the centering means 50 relative to the frame 12 is about the pivot bolt 71. As previously noted, the omnidirectional self-centering coupling 82 is able to accommodate any rotational movement and prevents the coupling from binding.

FIG. 4 illustrates the condition of the front wheels 22 and 24 when one of the steering levers 30 is pushed to the left, in order to turn the front wheels 22 and 24 to the right. FIG. 7 illustrates the condition of the centering means 50 when the steering levers 30 are manipulated as depicted in FIG. 4.

As illustrated in FIG. 7, movement of a steering lever 30 as indicated in FIG. 4 causes the rod member 52 to move reciprocally further into the tubular structure 54 The captured end 94 and the retaining head 96 of the rod member 52 moves without restraint through the hollow tube 62. However, the washer 102 is too large to pass through the hollow tube 62 and instead is pressed into abutment with the transverse edge thereof. Also, the tubular spacing sleeve 104 is forced by the adjustment nut 106 inwardly against the outwardly facing surface of the washer 100, and presses the washer 100 further into the tubular structure 54. As when the steering levers are turned in the opposite direction, this action likewise results in compression of the coil spring 58. The adjusing nut 106, the spacing sleeve 104 and the washer 100 thereby serve as a second means for compressing the coil spring 58 when the telescoping members 52 and 54 are pushed together from the predetermined condition of overlap depicted in FIG. 1.

The telescoping members 52 and 54 will not remain in the position of FIG. 7 once the steering levers 30 are released, however. It is evident from FIG. 7 that, due to its compressed condition, the coil spring 58 will act against the washer 100, the spacing sleeve 104 and the adjusting nut 106 to force the rod member 52 outwardly from the position of FIG. 7 back to the position of FIG. 1.

As is evident from the comparison of FIGS. 1 and 4, there is likewise a slight rotational movement in a horizontal plane of the centering means 50 relative to the frame 12, when the front wheels 22 and 24 are reoriented between the positions of FIGS. 1 and 4. Again, the centering means 50 rotates about the first coupling 70, and a character of the second coupling 82 prevents the system from binding.

By using the centering system of the invention in association with the parallelogram structure 20, the wheelchair 10 is provided with a front wheel stabilizing and self-centering mechanism which allows the wheelchair 10 to be propelled at high speeds and through turns without the dangers and without the vibration and shimmying which have been inherent in wheelchairs of conventional construction. Manipulation of the adjusting nut 106 will control the effective overall length of the centering means 50, and the extent of overlap of the telescoping members 52 and 54 to accommodate different models of wheelchairs, and to accommodate their structural variations among even wheelchairs of the same model.

Undoubtedly, numerous variations and modifications of the invention will become readily apparent to those familiar with wheelchair construction in general, and racing wheelchairs in particular. For example, in the embodiment illustrated the coupling 70 is shown connected to the wheelchair frame 12 and the coupling 82 is shown connected to the parallelogram structure 20. Quite obviously, this could be reversed with the coupling 70 connected to the parallelogram structure 20 and the coupling 82 connected to the wheelchair frame 12. Also, while the connecting linkage in the embodiment illustrated shows a complete parallelogram structure 20, the connecting linkage may take the form of a single tie rod between two front wheel assemblies, wherein the front wheels are maintained parallel to each other. Accordingly, the scope of the invention should not be construed as limited to the specific embodiment and the manner of implementation described herein, but rather is defined in the claims appended hereto.

I claim:

1. A wheelchair comprising a frame supporting a seat, a pair of rear wheels mounted in fixed orientation relative to said frame and having driving handwheels thereon, a linkage forming a parallelogram structure with hinged corners, a pair of front wheels mounted on said parallelogram structure in mutually parallel alignment and movable by said parallelogram structure in adjustable alignment relative to said rear wheels, steering means coupled to said parallelogram structure to selectively adjust the alignment of said front wheels, and a centering means for returning said front release of said steering means including a first member coupled to said parallelogram structure, a second member coupled to said frame in longitudinally offset, overlapping reciprocal fashion relative to said first member, and spring biasing means acting to urge said first and second, members toward relative longitudinal positions defining a predetermined distance of overlap.

2. A wheelchair according to claim 1 further comprising means for adjusting said predetermined distance of overlap.

3. A wheelchair according to claim 1 wherein said second member is comprised of a pair of longitudinally overlapping annular tubes including a first tube and a second tube secured coaxially within one end of said first tube and including a coupling connected to said frame, bushing means located within said first tube remote from said second tube and defining an annulus of diameter smaller than the internal diameter of said first tube, and said first member is comprised of a linear rod mounted for reciprocal movement within said annulus and having a free end protruding from said first tube with a coupling joined to said parallelogram structure and a captured end located within said second member and having a retaining element secured thereon, and said spring biasing means is disposed about said linear rod.

4. A wheelchair according to claim 3 wherein said spring biasing means is comprised of a coil spring disposed about said captured end of said rod and first and second washers disposed about said captured end of said rod at opposite ends of said coil spring, whereby said coiled spring biases said washers apart and said second member confines said washers and said coiled spring located therebetween within said first tube.

5. A wheelchair according to claim 4 further comprising a tubular spacing sleeve disposed about said rod remote from said retaining element to thereby establish a minimum separation between said first washer and said coupling to said parallelogram structure.

6. A wheelchair according to claim 3 further characterized in that said coupling to said parallelogram structure includes a spherical bearing having an axial aperture therethrough, a control pin extending from said parallelogram structure through said aperture in said spherical bearing and reciprocally movable therewithin, and a collar on said linear rod which captures said spherical bearing and allows limited, omnidirectional rotation of said spherical bearing therewithin.

7. A wheelchair centering mechanism for the front wheels of a wheelchair having pairs of front and back wheels mounted on a frame comprising:

wheel connecting linkage forming a parallelogram structure having pairs of parallel opposite sides and hinged corners and including stub axles extending laterally from opposite fore and aft sides thereof to carry said front wheels in mutually parallel disposition relative to each other and hingedly secured to said frame, a steering mechanism coupled to vary the relative orientation between said pairs of opposite sides of said parallelogram structure, first and second annular tubes, wherein said second tube is of smaller diameter than said first tube and is secured coaxially within one end of said first tube and extends longitudinally therefrom to a first coupling remote from said first tube, and wherein said first tube has a bushing defining an annular end orifice at the end thereof opposite said second tube, and said end orifice is of a diameter reduced from the internal diameter of said first tube, a linear rod mounted within said first tube with a protruding end extending out of said first tube through said end orifice and having a second coupling thereon and a captured end having a retaining element secured thereon, abutment means located on said rod in spaced separation from said retaining element, a first annular washer slideably disposed about said captured end of said rod and limited in longitudinal movement by said abutment means and by said bushing, a second annular washer slideably disposed about said captured end of said rod and limited in longitudinal movement by said retaining element and by said second tube, a coil spring disposed coaxially about said captured end of said rod to bias said first and second annular washers apart and one of said first and second couplings is connected to said frame and the other of said first and second coupling is connected to said parallelogram structure.

8. A wheelchair centering mechanism according to claim 7 further comprising means for longitudinally adjusting the position of said abutment means along said rod to thereby adjust the extent of overlap between said rod and said first and second tubes when said steering mechanism is released.

9. A wheel centering mechanism according to claim 8 wherein said abutment means is a tubular sleeve located coaxially about said rod between said second coupling and said first washer, and said means for adjusting is comprised of a nut threadably engaged on said rod between said sleeve and said second coupling.

10. In a wheelchair having pairs of front and back wheels mounted to support a frame, the improvement comprising:

front wheel connecting linkage means secured to said frame to allow adjustment of the orientation of said front wheels relative to said frame and to hold said front wheels parallel to each other, steering means coupled to said front wheel connecting linkage to control the orientation of said front wheels relative to said frame, and centering means having one telescoping element coupled to said frame, and another telescoping element connected to said linkage means, wherein said telescoping elements are longitudinally offset from each other in mutually overlapping fashion, and biasing means to bias said telescoping elements toward a selected overall length, whereby manipulation of said steering means overcomes said biasing means to move one of said telescoping elements in longitudinally reciprocal fashion relative to the other.

11. An improved wheelchair according to claim 10 wherein said other telescoping element is a tubular structure having a first section and a second section of smaller internal diameter than said first section and further including a bushing in said first section remote from said second section, and said one telescoping element is a linear rod having a free end projecting from said first section of said other telescoping element through said bushing and having a captured end with a retaining means thereon located within said other telescoping element, and said biasing means is comprised of a coil spring which acts between said telescoping members and said first means for compressing said coil spring when said telescoping members are drawn apart from a predetermined condition of overlap and second means for compressing said coil spring when said telescoping members are pushed together from said predetermined condition of overlap.

12. An improved wheelchair according to claim 11 wherein said first means for compressing is comprised of a first washer disposed about said captured end of said rod in sliding relationship therewith and said first washer is confined within said first section of said tubular structure between said coil spring and said bushing and said second means for compressing is comprised of a second washer disposed about said captured end of said rod in sliding relationship therewith and said second washer is confined within said first section of said tubular structure between said coil spring and said second section of said tubular structure.

* * * * *